(12) United States Patent
Graham et al.

(10) Patent No.: US 6,931,473 B2
(45) Date of Patent: Aug. 16, 2005

(54) DATA TRANSFER VIA HOST/PCI-X BRIDGES

(75) Inventors: Charles S. Graham, Rochester, MN (US); Gregory M. Nordstrom, Pine Island, MN (US); Thomas K. Pokrandt, Rochester, MN (US); Adalberto G. Yanes, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 10/195,925

(22) Filed: Jul. 16, 2002

(65) Prior Publication Data

US 2004/0015636 A1 Jan. 22, 2004

(51) Int. Cl.[7] .............................................. G06F 13/00
(52) U.S. Cl. ...................................... 710/311; 710/313
(58) Field of Search ........................... 710/48, 306, 311, 710/313

(56) References Cited

U.S. PATENT DOCUMENTS

| | | | | |
|---|---|---|---|---|
| 5,949,981 A | * | 9/1999 | Childers ..................... | 710/310 |
| 6,047,349 A | * | 4/2000 | Klein ......................... | 710/315 |
| 6,148,359 A | * | 11/2000 | Elkhoury et al. ........... | 710/311 |
| 6,219,761 B1 | | 4/2001 | Movall et al. | |
| 6,286,074 B1 | * | 9/2001 | Batchelor et al. .......... | 710/305 |
| 2003/0046473 A1 | * | 3/2003 | Dobson et al. ............. | 710/306 |
| 2003/0065847 A1 | * | 4/2003 | Goodrum et al. .......... | 710/113 |

* cited by examiner

*Primary Examiner*—Glenn A. Auve
(74) *Attorney, Agent, or Firm*—Moser, Patterson & Sheridan (57) ABSTRACT

Embodiments are provided in which a method is described for a processor to perform a task of accessing a PCI-X device via a PCI-X bridge, the PCI-X bridge including a processing circuit. The processor builds M read/write control blocks (RWCBs), M being a positive integer. Then, the processor signals the processing circuit and switches to another task. In response, the processing circuit fetches and processes the M RWCBs, one RWCB at a time, to access the PCI-X device. After processing the M RWCBs, the processing circuit interrupts the processor. In response, the processor obtains the result of the processing of the M RWCBs.

23 Claims, 7 Drawing Sheets

DATA TRANSFER VIA HOST/PCI-X BRIDGES

BACKGROUND OF THE INVENTION

1. Field of the Invention

The present invention generally relates to data transfer via PCI-X (Peripheral Component Interconnect-X) bridges, and more particularly to data transfer via Host/PCI-X bridges.

2. Description of the Related Art

In a conventional computer system, a Host/PCI-X bridge couples a Front Side Bus (FSB) and a PCI-X Bus (called PCI-X Bus 0). There may be a PCI-X device coupled to the PCI-X Bus 0. The FSB is connected to at least a processor and main memory. The processor, the main memory, and the PCI-X device communicate with each other via the FSB, the Host/PCI-X bridge, and the PCI-X Bus 0.

In such a conventional system, the processor stalls periodically during this time the processor is idle and unavailable to perform other tasks.

By way of installation, assume the processor needs to execute a read instruction reading data from the PCI-X device to the processor. The processor sends a read command and the address of the PCI-X device to the Host/PCI-X bridge via the FSB. Then, the processor stalls waiting for the requested data from the Host/PCI-X bridge. In response, the Host/PCI-X bridge forwards the read command and the address of the PCI-X device to the PCI-X device via the PCI-X Bus 0. Then, the PCI-X device gathers and sends the requested data back to the Host/PCI-X bridge via the PCI-X Bus 0. Finally, the Host/PCI-X bridge forwards the requested data to the processor via the FSB. After receiving the requested data from the Host/PCI-X bridge, the processor executes the next instruction.

Assume the processor later needs to execute a write instruction writing data from the processor to the PCI-X device. The processor sends a write command, the write data, and the address of the PCI-X device to the Host/PCI-X bridge via the FSB. Then, the processor stalls waiting for the write data to be written to the PCI-X device. In response, the Host/PCI-X bridge forwards the write command, the write data, and the address of the PCI-X device to the PCI-X device via the PCI-X Bus 0. After receiving the write data, the PCI-X device sends a write completion signal to the Host/PCI-X bridge via the PCI-X bus 0. Finally, the Host/PCI-X bridge forwards the write completion signal to the processor via the FSB. After receiving the write completion signal from the Host/PCI-X bridge, the processor executes the next instruction.

In summary, the execution of the read instruction causes the processor to stall until the requested data is returned. Similarly, the execution of the write instruction also causes the processor to stall until the write data is written to the PCI-X device. However, processor stalling deteriorates processor performance and, as such, is undesirable.

One prior art solution requires another processor to handle read or write instructions for the main processor. However, using an additional processor is costly and wastes precious real estate.

Accordingly, there is a need for an apparatus and method in which reading from and writing to a PCI-X device via a bridge are performed without processor stalling and without the use of an additional processor.

SUMMARY OF THE INVENTION

In one embodiment, a method is described for a processor to perform a task of accessing a device via a bridge which comprises a processing circuit. The method comprises (a) building at least a first read/write control block (RWCB) with the processor, (b) signaling the processing circuit and switching to another task with the processor, (c) processing at least the first RWCB with the processing circuit to access the device, and (d) interrupting the processor with the processing circuit.

In another embodiment, a digital system for transferring data is described. The system comprises a processor, a device, and a bridge coupling the processor and the device, wherein the bridge includes a processing circuit. The processor is configured to build at least a first RWCB, signal the processing circuit to access the device, and switch to a task other than stalling waiting for a result of the accessing of the device by the processing circuit. The processing circuit is configured to process at least the first RWCB to access the device and interrupt the processor.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments are provided in which a method is described for a processor to perform a task of accessing a PCI-X device via a Host/PCI-X bridge which comprises a processing circuit. The processor builds M read/write control blocks (RWCBs), M being a positive integer. Then, the processor signals the processing circuit and switches to another task. In response, the processing circuit fetches and processes the M RWCBs, one RWCB at a time, to access the PCI-X device. After processing the M RWCBs, the processing circuit interrupts the processor. In response, the processor obtains the result of the processing of the M RWCBs by the processing circuit.

Figure 1:
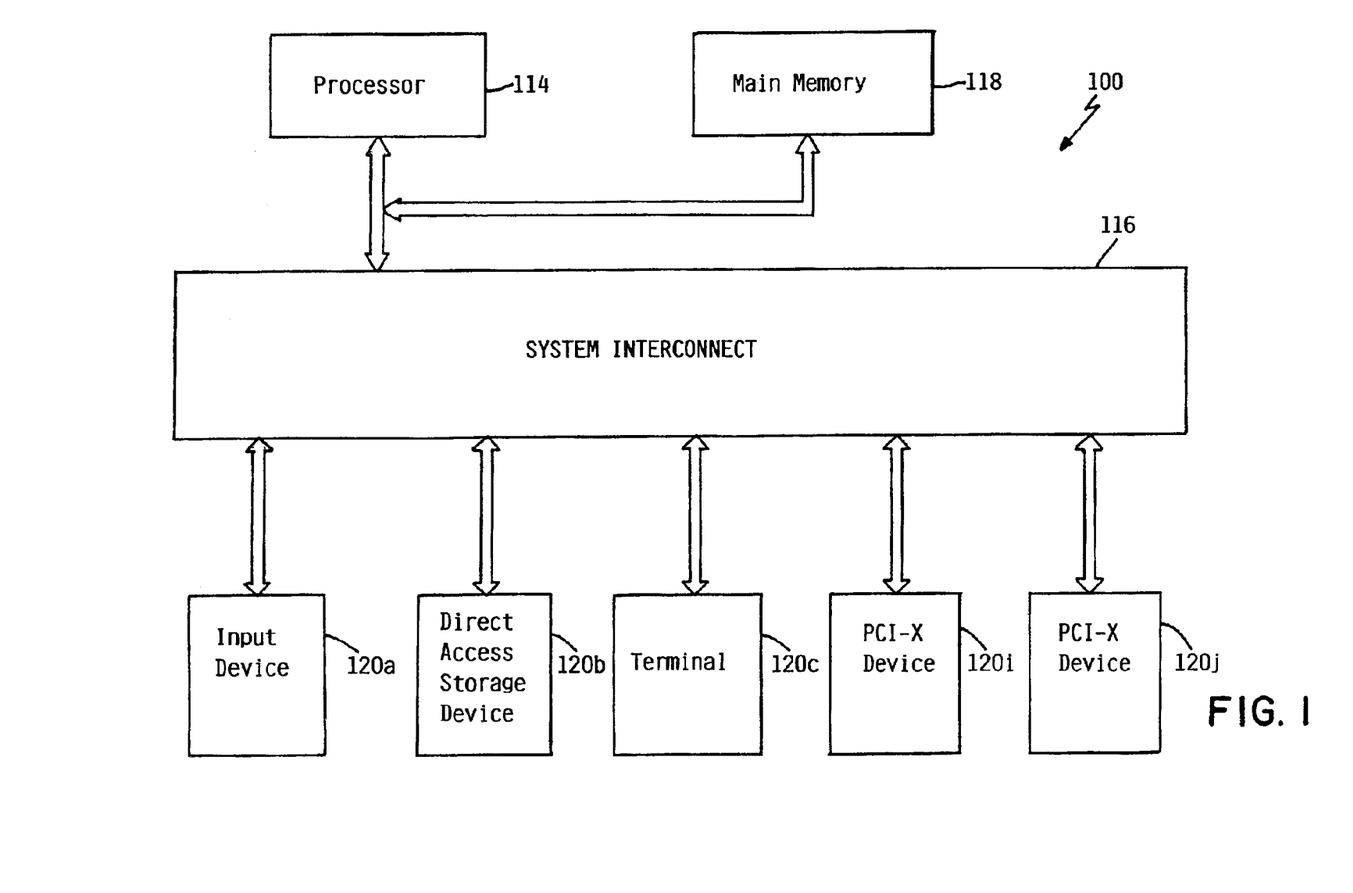
FIG. 1 is a computer system 100 according to an embodiment.

FIG. 1 is a computer system 100 according to an embodiment. In general, the computer system 100 may be a desktop or PC-based computer, a workstation, a network terminal, or other networked computer system. Illustratively, the computer system 100 includes a system interconnect 116. The computer system 100 also includes at least a processor 114, a main memory 118, an input device 120*a*, a storage device 120*b*, a terminal 120*c*, and PCI-X devices 120*i* and 120*j* (collectively, PCI-X devices 120); all coupled to system interconnect 116.

Terminal 120*c* is any display device such as a cathode ray tube (CRT) or a plasma screen. The PCI-X devices 120*i* and 120j may be any devices that transfer data and control signals with other devices via the system interconnect 116 according to the PCI-X specification. Input device 120a can be any device to give input to the computer system 100. For example, a keyboard, keypad, light pen, touch screen, button, mouse, track ball, or speech recognition unit could be used. Further, although shown separately, the terminal 120c and input device 120a could be combined. For example, a display screen with an integrated touch screen, a display with an integrated keyboard or a speech recognition unit combined with a text speech converter could be used.

Storage device 120b is DASD (Direct Access Storage Device), although it could be any other storage such as floppy disc drives or optical storage. Although storage 120b is shown as a single unit, it could be any combination of fixed and/or removable storage devices, such as fixed disc drives, floppy disc drives, tape drives, removable memory cards, or optical storage. Main memory 118 and storage device 120b could be part of one virtual address space spanning multiple primary and secondary storage devices.

The contents of main memory 118 can be loaded from and stored to the storage device 120b as the processor 114 has a need for it. Main memory 118 is any memory device sufficiently large to hold the necessary programming and data structures of the invention. The main memory 118 could be one or a combination of memory devices, including random access memory (RAM), non-volatile or backup memory such as programmable or flash memory or read-only memory (ROM). The main memory 118 may be physically located in another part of the computer system 100. While main memory 118 is shown as a single entity, it should be understood that memory 118 may in fact comprise a plurality of modules, and that main memory 118 may exist at multiple levels, from high speed to low speed memory devices.

Figure 2:
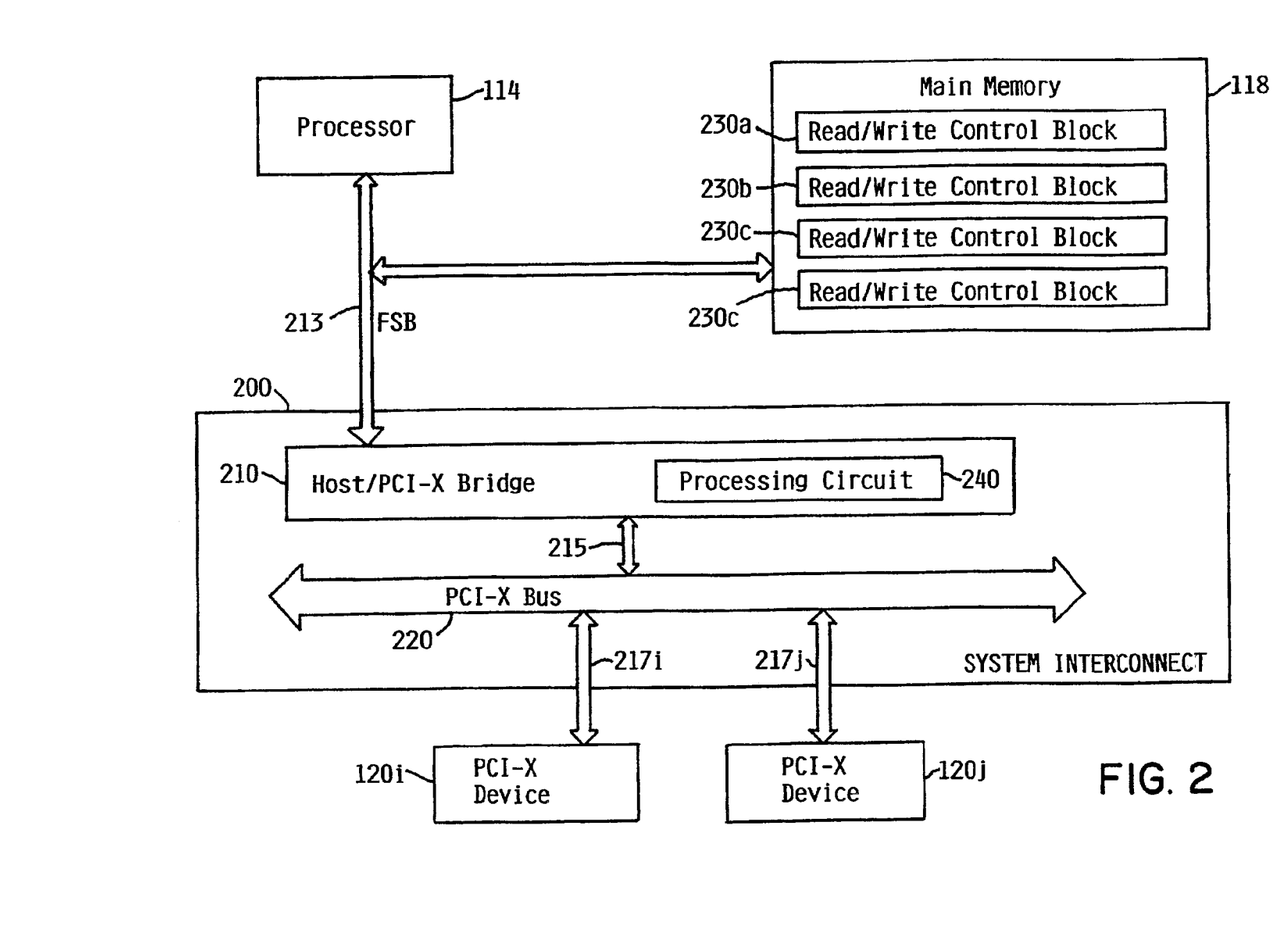
FIG. 2 shows a system interconnect 200 as an embodiment of the system interconnect 116 of FIG. 1.

FIG. 2 shows a system interconnect 200 as an embodiment of the system interconnect 116 of FIG. 1. Illustratively, the system interconnect 200 includes a Host/PCI-X bridge 210 and a PCI-X bus 220 coupled together via a connection 215. The PCI-X bus 220 is also coupled to, illustratively, the PCI-X devices 120i and 120j via connections 217i and 217j, respectively. The Host/PCI-X bridge 210 is also coupled to the main memory 118 and the processor 114 via a front side bus (FSB) 213. The Host/PCI-X bridge 210 includes, illustratively, a processing circuit 240 configured to perform accesses to the PCI-X devices 120i and 120j by the processor 114. The main memory 118 stores, illustratively, two read/write control blocks (RWCB) 230a and 230b which contain control information used by the processing circuit 240 in carrying out accesses to the PCI-X device 120i by the processor 114. In general, a RWCB is a group of binary bits generated by the processor 114 and stored in the main memory 118. A RWCB contains control information used by the processing circuit 240 in carrying out accesses to a PCI-X device 120 by the processor 114. The main memory 118 also stores, illustratively, two read/write control blocks (RWCB) 230c and 230d which contain control information used by the processing circuit 240 in carrying out accesses to the PCI-X device 120j by the processor 114. It is understood that more or less than two RWCBs 230 may be used to store control information used by the processing circuit 240 in carrying out accesses to a PCI-X device 120 by the processor 114.

Figure 3:
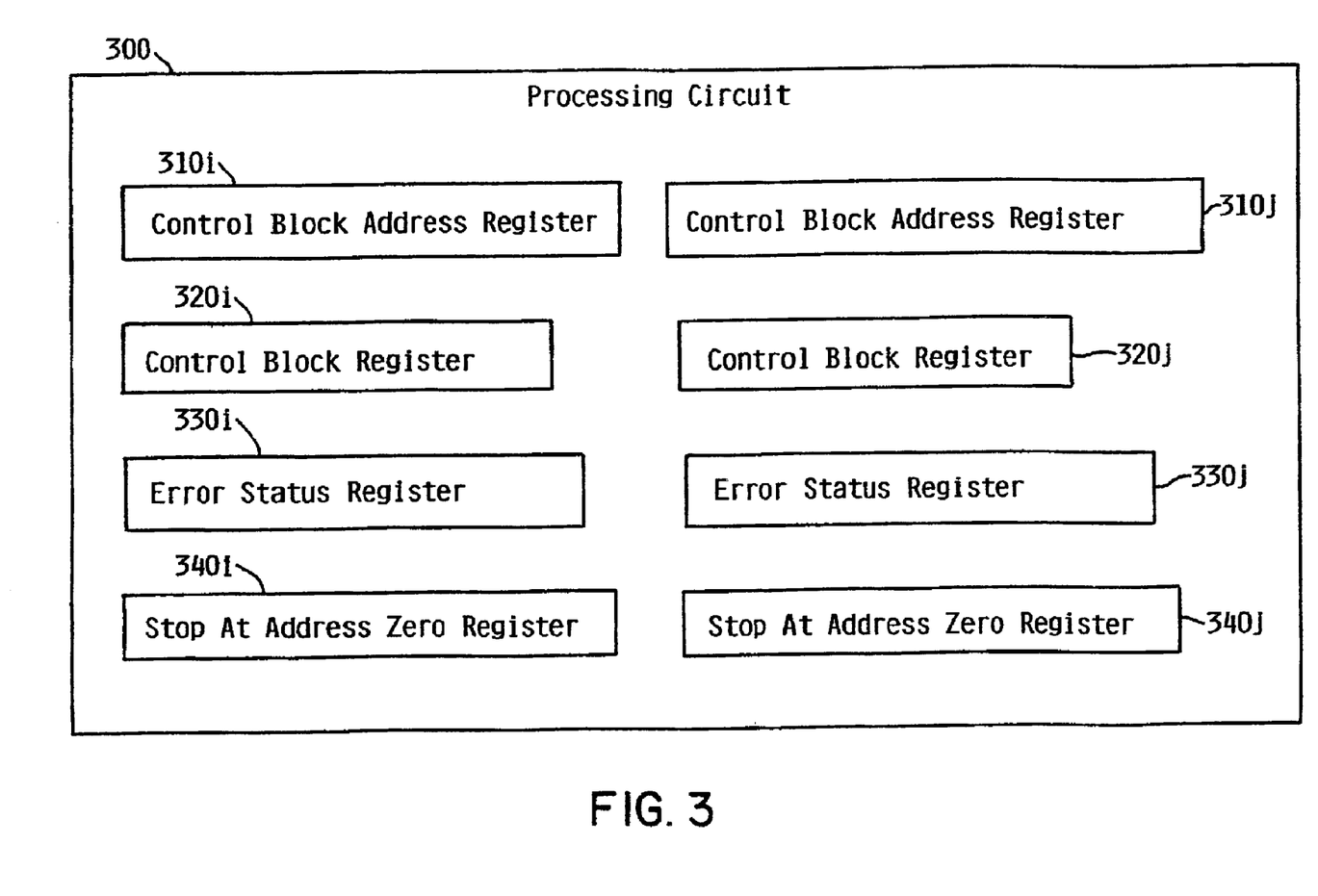
FIG. 3 shows a processing circuit 300 as an embodiment of the processing circuit 240 of FIG. 2.

FIG. 3 shows a processing circuit 300 as an embodiment of the processing circuit 240 of FIG. 2. The processing circuit 300 includes, illustratively, two control block address registers 310i and 310j (collectively, control block address registers 310), two control block registers 320i and 320j (collectively, control block registers 320), two error status registers 330i and 330j (collectively, error status registers 330), and two stop at address zero registers 340i and 340j (collectively, stop at address zero registers 340), corresponding to the two PCI-X devices 120i and 120j, respectively. It is understood that in general there may be N PCI-X devices 120 on the PCI-X Bus 220 and the processing circuit 300 should include a control block address register 310, a control block register 320, an error status register 330, and a stop at address zero register 340 for each of the N PCI-X devices 120 on the PCI-X Bus 220.

The control block address register 310i is used to store the address of one of the read/write control blocks 230a and 230b in the main memory 118 as a first RWCB. Similarly, the control block address register 310j is used to store the address of one of the read/write control blocks 230c and 230d in the main memory 118 as a first RWCB. The control block registers 320 are used to store read/write control blocks to be processed by the processing circuit 300. The error status registers 330 are used to store an error status code corresponding to the error encountered during the processing of the RWCB(s) by the processing circuit 300. The content of a stop at address zero register 340 indicates to the processing circuit 300 whether to stop accessing the corresponding PCI-X device 120 when the processing circuit 300 encounters an address zero in a RWCB corresponding to the PCI-X device 120.

Figure 4:
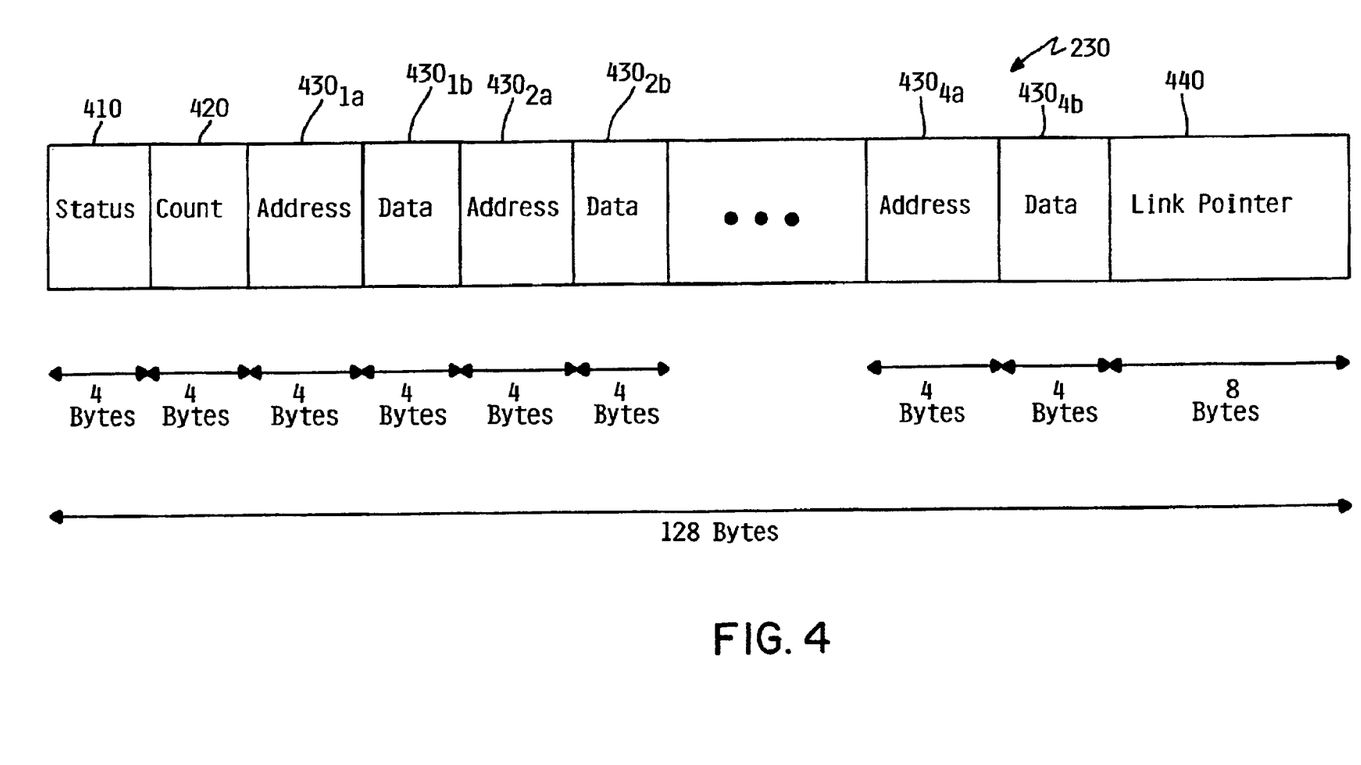
FIG. 4 shows one embodiment of a read/write control block 230 of FIG. 2.

FIG. 4 shows one embodiment of the read/write control blocks 230a, 230b, 230c, and 230d (collectively, the RWCBs 230) of FIG. 2. Illustratively, the read/write control block 230 includes a status field 410 of 4 bytes, a count field 420 of 4 bytes, 14 address/data fields $430_1$, $430_2$, ..., $430_{14}$ (collectively, the address/data field 430) of 8 bytes each, and a link pointer field 440 of 8 bytes (i.e., 128 bytes in total). The status field 410 contains the status information after the processing circuit 300 processes the corresponding control block 230. The count field 420 contains the maximum number of address/data fields 430 that need to be processed (i.e., 14 decimal). The address/data field $430_1$ includes an address field $430_{1a}$ of 4 bytes which contains the address to read from or to write to. The address/data field $430_1$ also includes a data field $430_{1b}$ of 4 bytes which stores the data to be written to the address in the address field $430_{1a}$. On reads, the data field $430_{1b}$ contains the address where the read data should be placed. The address/data fields $430_2$ ... $430_{14}$ have the same structure as that of the address/data field $430_1$. For an address/data field $430_k$ (k=1–14), the reading of 4 bytes of data from the address in the address field $430_{ka}$ is called a read phase. Similarly, the writing of 4 bytes of data from the data field $430_{kb}$ to the address in the address field $430_{ka}$ is called a write phase.

In one embodiment, data transfer in the system 100 is performed 4 bytes at a time and the addresses are 4 bytes aligned. As a result, the two least significant bits of the addresses are always zeros. In one embodiment, the least significant bit of the address field $430_{ka}$ (k=1–14) can be used to indicate whether a read phase or a write phase is to be performed with respect to the address/data field $430_k$. For instance, a one as the least significant bit of the address field $430_{ka}$ indicates a read phase is to be performed with respect to the address/data field $430_k$. A zero as the least significant bit of the address field $430_{ka}$ indicates a write phase is to be performed with respect to the address/data field $430_k$.

It is understood that the number of address/data fields 430 in a WRCB 230 may be more or less than 14d depending on the size of the WRCB 230. The link pointer field 440 contains the address of the next read/write control block 230 to be processed by the processing circuit 300. As a result, the RWCBs 230 form a chain of RWCBs to be processed by the processing circuit 300. If a read/write control block 230 is the last one to be processed, its link pointer field 440 contains all zeros.

Figure 5A:
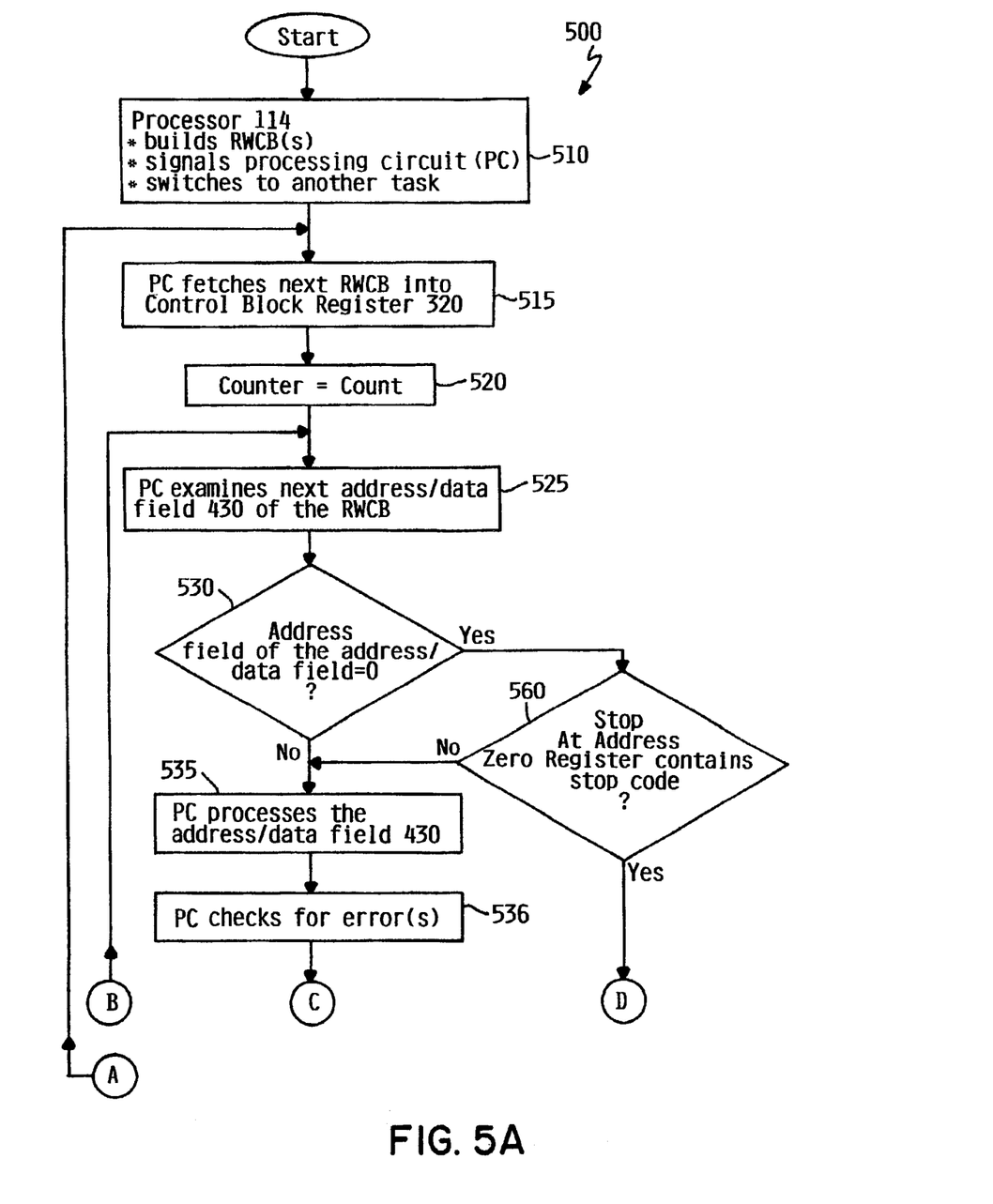
FIG. 5 shows one embodiment of a method 500 for data transfer via the Host/PCI-X bridge 210 of FIG. 2.
Figure 5B:
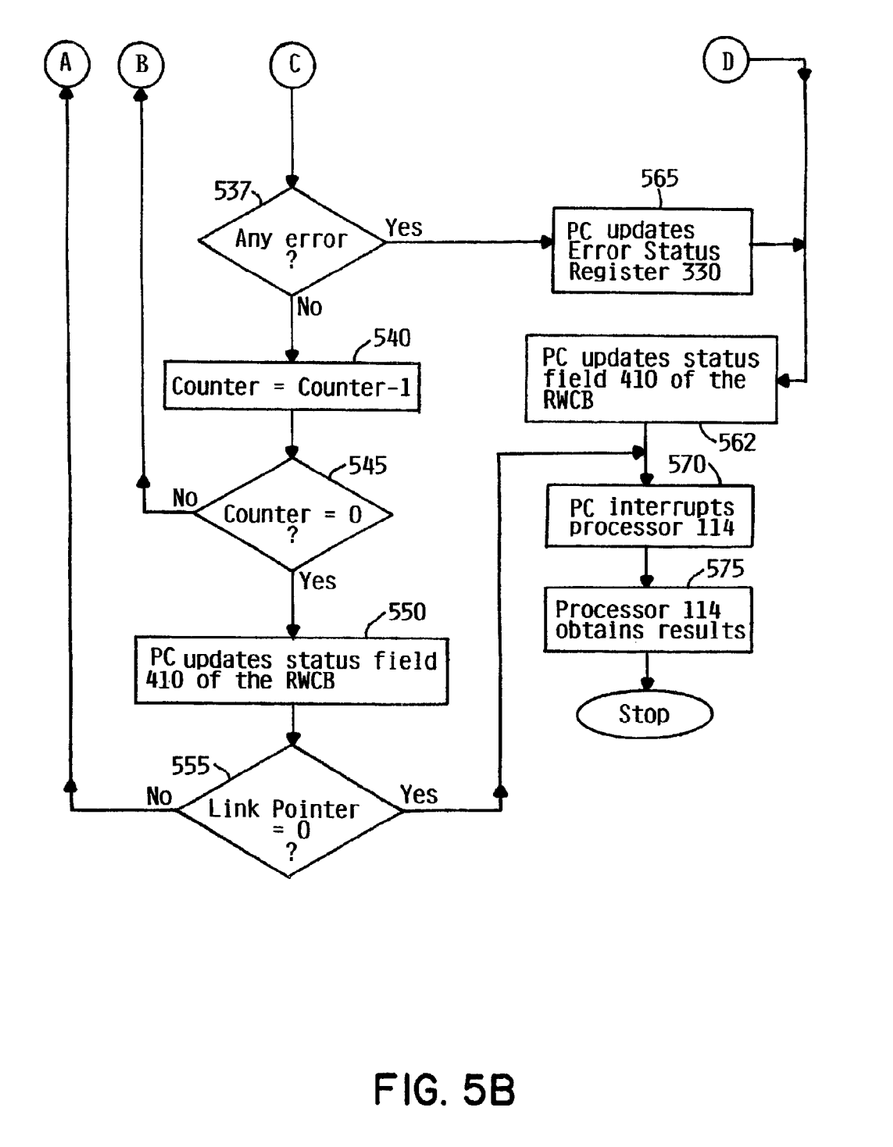

FIG. 5 shows one embodiment of a method 500 for data transfer via the Host/PCI-X bridge 210. The method 500 starts at step 510 where the processor 114 begins a transaction of accessing a PCI-X device 120 by building one or more RWCBs in main memory 118, signaling the processing circuit 300, and switching to another task. In step 515, the processing circuit 300 fetches the next (or first, if no previous one exists) RWCB from main memory 118 into the control block register 320 corresponding to the PCI-X device 120. In step 520, the processing circuit 300 initializes a variable counter to the value of the count field 420 of the fetched RWCB. In step 525, the processing circuit 300 examines the next (or first, if no previous one exists) address/data field 430 of the RWCB. In step 530, a determination is made as to whether the address field of the address/data field 430 is zero. If not, in step 535, the processing circuit 300 processes the address/data field. In step 536, the processing circuit 300 checks for error(s) encountered during the processing of the address/data field 430. In step 537, a determination is made as to whether an error has occurred. If not, in step 540, the variable counter is decremented by 1. In step 545, a determination is made as to whether the variable counter is zero. If not (i.e., not all address/data fields 430 in the RWCB have been processed), in step 525, the processing circuit 300 examines the next address/data field 430 of the RWCB. If all address/data fields 430 in the RWCB have been processed, processing proceeds from step 545 to step 550, where the processing circuit 300 updates the status field 410 of the RWCB. Then, in step 555, a determination is made as to whether the link pointer field 440 of the RWCB contains all zeros. If not (i.e., at least another RWCB needs to be processed), in step 515, the processing circuit 300 fetches the next RWCB from main memory 118 into the control block register 320 corresponding to the PCI-X device 120. Otherwise (i.e., all RWCBs have been processed), in step 570, the processing circuit 300 interrupts the processor 114. In step 575, the processor 114 obtains the results of the processing of the RWCBs by the processing circuit 300.

If the determination in step 537 results in a YES, in step 565, the processing circuit 300 updates the error status register 330 with an error status code indicating what error has been encountered by the processing circuit 300. Then, in step 562, the processing circuit 300 updates the status field 410 of the RWCB. Then, steps 570 and 575 are performed.

If the determination in step 530 results in a YES, in step 560, another determination is made as to whether the corresponding stop at address zero register 340 contains a stop code. If yes, in step 562, the processing circuit 300 updates the status field 410 of the RWCB. Then, steps 570 and 575 are performed. If step 560 is answered negatively, the transaction is not complete yet and the method 500 proceeds to step 535.

For illustration of the method 500, assume, as a first example, the processor 114 needs to perform a read transaction to read 80 bytes from the PCI-X device 120i to the processor 114. The processor 114 builds two read/write control blocks (RWCB) 230a and 230b in the memory 118 (at step 510). For the RWCB 230a, the processor 114 zeros the status field 410 and sets the count field 420 to 14d (i.e., 14 decimal, which is the maximum allowed number of address/data fields 430 in a RWCB). The processor 114 also fills the 14 address fields $430_{1a}$ ... $430_{14a}$ of the RWCB 230a with the addresses where data needs to be read from (these addresses should belong to the PCI-X device 120i). For each of the 14 address fields $430_{1a}$ ... $430_{14a}$ of the RWCB 230a, the processor 114 sets the least significant bit to one to indicate that a read phase is to be performed with respect to each of the 14 address/data fields 430 of the RWCB 230a. As a result, RWCB 230a will cause the processing circuit 300 to perform 14 read phases to read 14×4 bytes=56 bytes from the PCI-X device 120i. The processor 114 also fills the 14 data fields $430_{1b}$ ... $430_{14b}$ of the RWCB 230a with the addresses where read data should be placed. The processor 114 also fills the link pointer field 440 of the RWCB 230a with the address of the RWCB 230b in memory 118. As a result, the RWCBs 230a and 230b form a chain of RWCBs to be processed by the processing circuit 300.

For the RWCB 230b, the processor 114 zeros the status field 410 and sets the count field 420 to 14d. The processor 114 also fills the 6 address fields $430_{1a}$ ... $430_{6a}$ of the RWCB 230b with the addresses where data needs to be read from. For each of the 6 address fields $430_{1a}$ ... $430_{6a}$ of the RWCB 230b, the processor 114 sets the least significant bit to one to indicate that a read phase is to be performed with respect to each of the 6 address/data field 430 of the RWCB 230b. The processor 114 also zeros the address field $430_{7a}$ of the RWCB 230b and inserts a stop code in the stop at address zero register 340i to indicate to the processing circuit 300 that the read transaction of 80 bytes should end. As a result, RWCB 230b will cause the processing circuit 300 to perform 6 read phases to read 6×4 bytes=24 bytes from the PCI-X device 120i. In combination, RWCBs 230a and 230b will cause the processing circuit 300 to perform 14+6=20 read phases to read 20×4 bytes=80 bytes from the PCI-X device 120i as requested by the processor 114. The processor 114 also fills the 6 data fields $430_{1b}$ ... $430_{6b}$ of the RWCB 230b with the addresses where read data should be placed. In one embodiment, the processor 114 also fills the link pointer field 440 of the RWCB 230b with all zeros to indicate to the processing circuit 300 that the RWCB 230b is the last RWCB to be processed by the processing circuit 300.

In one embodiment, after building the two RWCB 230a and 230b in the memory 118, the processor 114 writes the address of the RWCB 230a, as a first RWCB, to the control block address register 310i of the processing circuit 300 in the Host/PCI-X bridge 210 to signal the processing circuit 300 (at step 510). Then, the processor 114 switches to another task without stalling (at step 510). In response to the control block address register 310i being written with the address of the RWCB 230a, the processing circuit 300 fetches the RWCB 230a from the memory address contained in the control block address register 310i into the control block register 320i (at step 515) and processes the RWCB 230a (at steps 525, 530, and 535). In processing the RWCB 230a, the processing circuit 300 performs 14 read phases corresponding to the 14 address/data fields 430 of the RWCB 230a (steps 525, 530, and 535 are performed 14 times), assuming no error occurs. More specifically, for the address/data field $430_1$ of the RWCB 230a, the processing circuit 300 reads data from the address contained in the address field $430_{1a}$ into the address contained in the data field $430_{1b}$ of the RWCB 230a in the control block register 320i (at step 535, first time). After that, in a similar way, the processing circuit 300 performs the read phase corresponding to the address/data field $430_2$ of the RWCB 230a (at step 535, second time), and so on until all 14 read phases are complete (i.e., the counter reaches zero in steps 540 and 545).

After performing 14 read phases corresponding to the RWCB 230a, the processing circuit 300 updates the status field 410 of the RWCB 230a in the control block register 320i to reflect the results of the processing of the RWCB 230a (at step 550). For instance, the processing circuit 300 may write a value of 8000 0000H into the status field 410 of the RWCB 230a to indicate that the processing of the RWCB 230a is complete with no errors. Otherwise, the processing circuit 300 may write a value of 0003 0000H into the status field 410 of the RWCB 230a to indicate that the processing of the RWCB 230a is complete with an error. In one embodiment, after updating the status field 410 of the RWCB 230a in the control block register 320i, the processing circuit 300 writes the updated RWCB 230a back to the main memory 118. Then, the processing circuit 300 examines the link pointer field 440 of the RWCB 230a in the control block register 320i (at step 555). Because a nonzero address value (the address of the RWCB 230b) is found in the link pointer field 440, the RWCB 230a is not the last RWCB to be processed. In response, the processing circuit 300 fetches the next RWCB 230b from the memory address contained in the link pointer field 440 of the RWCB 230a into the control block register 320i (at step 515).

In processing the RWCB 230b, the processing circuit 300 performs 6 read phases corresponding to the 6 address/data fields $430_1$–$430_6$ of the RWCB 230b (steps 525, 530, and 535 are performed 6 times), assuming no error occurs. More specifically, for the address/data field $430_1$ of the RWCB 230b, the processing circuit 300 reads data from the address contained in the address field $430_{1a}$ into the address contained in the data field $430_{1b}$ of the RWCB 230b in the control block register 320i (at step 535, first time). After that, in a similar way, the processing circuit 300 performs the read phase corresponding to the address/data field $430_2$ of the RWCB 230b (at step 535, second time), and so on until 6 read phases are complete (however, the counter has not reached zero). Then, the processing circuit 300 encounters a zero value in the address field $430_{7a}$ (at step 525 and a Yes in step 530). In response, the processing circuit 300 examines the stop at address zero register 340i (at step 560). Because a stop code is found there, the processing circuit 300 stops processing the RWCB 230b and updates the status field 410 of the RWCB 230b in the control block register 320i to reflect the results of the processing of the RWCB 230b (step 562). In one embodiment, after updating the status field 410 of the RWCB 230b in the control block register 320i, the processing circuit 300 writes the updated RWCB 230b back to the main memory 118.

In one embodiment, after writing the updated RWCB 230b back to the main memory 118, the processing circuit 300 may interrupt the processor 114 (at step 570). In response, the processor 114 examines the content of the error status register 330i. Because no error status code is found in the error status register 330i indicating that the entire read transaction of 80 bytes is complete without error, the processor 114 obtains the requested 80 bytes of data from the 20 addresses contained in the 20 data fields 430b of the two RWCBs 230a and 230b in the main memory 118 (at step 575).

As a second example illustrating the method 500, the processor 114 needs to perform a write transaction to write 88 bytes to the PCI-X device 120j. The processor 114 builds two read/write control blocks (RWCB) 230c and 230d in the memory 118 (at step 510). For the RWCB 230c, the processor 114 zeros the status field 410 and sets the count field 420 to 14d. For the address/data field $430_1$, the processor 114 fills the address field $430_{1a}$ with an address and fills the data field $430_{1b}$ with data to be written to the address contained in the address field $430_{1a}$. Then, the processor 114 fills the address field $430_{2a}$ with an address and fills the data field $430_{2b}$ with data to be written to the address contained in the address field $430_{2a}$, and so on until all 14 address/data fields 430 of the RWCB 230c are filled with addresses and data (these addresses should belong to the PCI-X device 120j). In addition, for each of the 14 address fields $430_{1a}$ ... $430_{14a}$ of the RWCB 230c, the processor 114 sets the least significant bit to zero to indicate that a write phase is to be performed with respect to each of the 14 address/data fields 430 of the RWCB 230c.

As a result, RWCB 230c will cause the processing circuit 300 to perform 14 write phases to write 14×4 bytes=56 bytes to the PCI-X device 120j. The processor 114 also fills the link pointer field 440 of the RWCB 230c with the address of the RWCB 230d in the memory 118. As a result, the RWCBs 230c and 230d form a chain of RWCBs to be processed by the processing circuit 300.

Similarly, for the RWCB 230d, the processor 114 zeros the status field 410 and sets the count field 420 to 14d. The processor 114 also fills the 8 address fields $430_{1a}$ ... $430_{8a}$ of the RWCB 230d with addresses and fills the 8 data fields $430_{1b}$ ... $430_{8b}$ of the RWCB 230d with data to be written to the addresses in the 8 address fields $430_{1a}$ ... $430_{8a}$. For each of the 8 address fields $430_{1a}$ ... $430_{8a}$ of the RWCB 230d, the processor 114 sets the least significant bit to zero to indicate that a write phase is to be performed with respect to each of the 8 address/data fields 430 of the RWCB 230d. As a result, RWCB 230d will cause the processing circuit 300 to perform 8 write phases to write 8×4 bytes=32 bytes to the PCI-X device 120j. In combination, RWCBs 230c and 230d will cause the processing circuit 300 to perform 14+8=22 write phases to write 22×4 bytes=88 bytes to the PCI-X device 120j as instructed by the processor 114.

The processor 114 also zeros the address field $430_{9a}$ of the RWCB 230d and inserts a stop code in the stop at address zero register 340j to indicate to the processing circuit 300 that the write transaction of 88 bytes should end. The processor 114 also fills the link pointer field 440 of the RWCB 230d with all zeros to indicate to the processing circuit 300 that the RWCB 230d is the last RWCB to be processed by the processing circuit 300.

In one embodiment, after building the two RWCB 230c and 230d in the memory 118, the processor 114 writes the address of the RWCB 230c, as a first RWCB, to the control block address register 310j of the processing circuit 300 in the Host/PCI-X bridge 210 to signal the processing circuit 300 (at step 510). Then, the processor 114 switches to another task without stalling (at step 510). In response to the control block address register 310j being written with the address of the RWCB 230c, the processing circuit 300 fetches the RWCB 230c from the memory address contained in the control block address register 310j into the control block register 320j (at step 515) and processes the RWCB 230c (at steps 525, 530, and 535). In processing the RWCB 230c, the processing circuit 300 performs 14 write phases corresponding to the 14 address/data fields 430 of the RWCB 230c (steps 525, 530, and 535 are performed 14 times), assuming no error occurs. More specifically, for the address/data field $430_1$ of the RWCB 230c, the processing circuit 300 writes data from the data field $430_{1b}$ to the address contained in the address field $430_{1a}$ (at step 535, first time). After that, in a similar way, the processing circuit 300 performs the write phase corresponding to the address/data field $430_2$ of the RWCB 230c (at step 535, second time), and so on until all 14 write phases are complete (i.e., the counter reaches zero in steps 540 and 545).

After performing 14 write phases corresponding to the RWCB 230c, the processing circuit 300 updates the status field 410 of the RWCB 230c in the control block register 320j to reflect the results of the processing of the RWCB 230c (at step 550). For instance, the processing circuit 300 may write a value of 8000 0000H into the status field 410 of the RWCB 230c to indicate that the processing of the RWCB 230c is complete with no errors. In one embodiment, after updating the status field 410 of the RWCB 230c in the control block register 320j, the processing circuit 300 writes the updated RWCB 230c back to the main memory 118. Then, the processing circuit 300 examines the link pointer field 440 of the RWCB 230c in the control block register 320j (at step 555). Because a nonzero address value (the address of the RWCB 230d) is found in the link pointer field 440, the RWCB 230c is not the last RWCB to be processed. In response, the processing circuit 300 fetches the next RWCB 230d from the memory address contained in the link pointer field 440 of the RWCB 230c into the control block register 320j (at step 515).

In processing the RWCB 230d, the processing circuit 300 performs 8 write phases corresponding to the 8 address/data fields $430_1$–$430_8$ of the RWCB 230d (i.e., steps 525, 530, and 535 are performed 8 times), assuming no error occurs. More specifically, for the address/data field $430_1$ of the RWCB 230d, the processing circuit 300 writes data from the data field $430_{1b}$ to the address contained in the address field $430_{1a}$(at step 535, first time). After that, in a similar way, the processing circuit 300 performs the write phase corresponding to the address/data field $430_2$ of the RWCB 230d (at step 535, second time), and so on until 8 write phases are complete (however, the counter has not reached zero). Then, the processing circuit 300 encounters a zero value in the address field $430_{9a}$ (at step 525 and a Yes in step 530). In response, the processing circuit 300 examines the stop at address zero register 340j (at step 560). Because a stop code is found there, the processing circuit 300 stops processing the RWCB 230d and updates the status field 410 of the RWCB 230d in the control block register 320j to reflect the results of the processing of the RWCB 230d (step 562). In one embodiment, after updating the status field 410 of the RWCB 230d in the control block register 320j, the processing circuit 300 writes the updated RWCB 230d back to the main memory 118.

In one embodiment, after writing the updated RWCB 230d back to the main memory 118, the processing circuit 300 may interrupt the processor 114 (at step 570). In response, the processor 114 examines the content of the error status register 330j (at step 575). Because no error status code is found in the error status register 330j indicating that the entire write transaction of 88 bytes is complete without error, the processor 114 moves on to the instruction immediately after the write transaction of 88 bytes.

In another embodiment of the method 500, the stop at address zero registers 340 are not used and the processor 114 does not zero the address field $430_{ka}$ to indicate that the processing circuit 300 should stop. Instead, the processor 114 inserts in the count field 420 of a RWCB the number of the address/data fields 430 to be processed with respect to the RWCB. As a result, steps 525, 530, and 560 are omitted from FIG. 5, and step 520 goes directly to step 535.

For instance, in the first example, the processor 114 does not zero the address field $430_{7a}$ of the RWCB 230b. Instead, the processor 114 sets the count field 420 of the RWCB 230b to 6d. As a result, after the processing circuit 300 processes the address/data field $430_6$ of the RWCB 230b (at step 535), the counter reaches zero (at steps 540 and 545) and steps 550, 555, 570, and 575 are performed in that order.

Similarly, in the second example, the processor 114 does not zero the address field $430_{9a}$ of the RWCB 230d. Instead, the processor 114 sets the count field 420 of the RWCB 230d to 8d. As a result, after the processing circuit 300 processes the address/data field $430_8$ of the RWCB 230d (at step 535), the counter reaches zero (at steps 540 and 545) and steps 550, 555, 570, and 575 are performed in that order.

In one embodiment, while the processing circuit is processing a RWCB 230, if a nonzero value is written to the control block address register 310, the processing circuit 300 stops and updates the error status register 330 to indicate that an error has occurred. Then, the processing circuit 300 interrupts the processor 114. In response, processor 114 examines the content of the error status register 330 and responds accordingly. In another embodiment, accesses to the control block registers 320 are atomic with respect to all fields.

In summary, when the processor 114 needs to access a PCI-X device 120 via the Host/PCI-X bridge 210, the processor 114 builds one or more RWCBs 230 in the main memory 118. Then, the processor 114 writes the memory address of the first RWCB into the control block address register 310 corresponding to the PCI-X device 120 and switches to another task without stalling. In response, the processing circuit 300 in the Host/PCI-X bridge 210 fetches and processes the first RWCB. After processing the first RWCB, the processing circuit 300 updates the status field 410 of the first RWCB and writes the updated RWCB back to the main memory 118. Then, the processing circuit 300 moves on to the next RWCB, if any. After processing the last RWCB, the processing circuit 300 interrupts the processor 114. In response, the processor 114 obtains the results of the processing of the RWCB(s) by the processing circuit 300.

Figure 6:
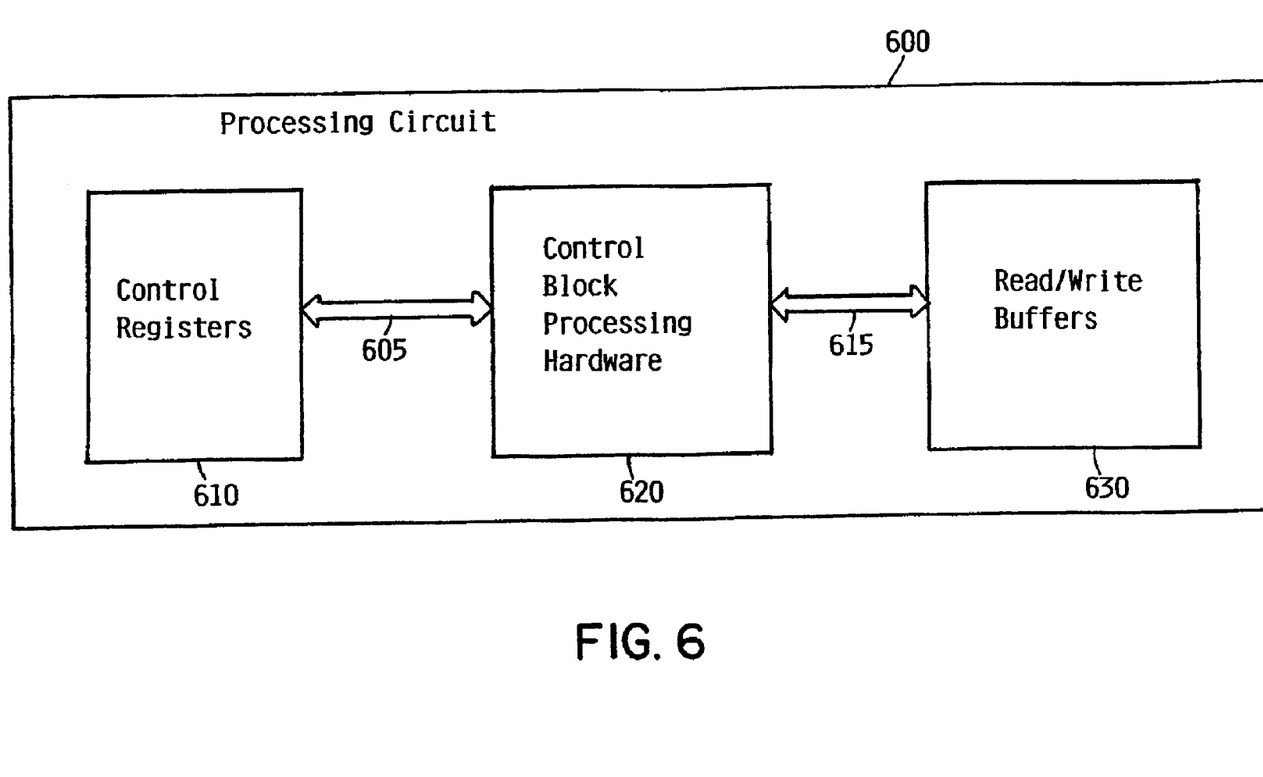
FIG. 6 shows a processing circuit 600 as an embodiment of the processing circuit 240 of FIG. 2.

FIG. 6 shows a processing circuit 600 as an embodiment of the processing circuit 240 of FIG. 2. Illustratively, the processing circuit 600 comprises control block processing hardware 620, control registers 610, and read/write buffers 630. The control block processing hardware 620 is coupled to the control registers 610 via a connection 605 and to the read/write buffers 630 via a connection 615. In one embodiment, the control block processing hardware 620 includes logic needed to process read/write control blocks. The read/write buffers 630 temporarily stores read data during a read phase and write data during a write phase. In one embodiment, the control registers 610 comprises the control block address registers 310, control block registers 320, the error status registers 330, and the stop at address zero registers 340 of FIG. 3. In one embodiment, during a read phase, the control block processing hardware 620 receives a first address and a second address from the control registers 610. The control block processing hardware 620 then obtains read data from the first address, temporarily stores the read data in the read/write buffers 630, and later transfers the read data from the read/write buffers 630 to the second address. During a write phase, the control block processing hardware 620 receives write data and a write address from the control registers 610. The control block processing hardware 620 then temporarily stores the write data in the read/write buffers 630 and transfers the write data to the write address.

In one embodiment, the read/write buffers 630 also temporarily stores the first and second addresses during the read phase. The read/write buffers 630 also temporarily stores the write address during the write phase.

In one embodiment, the processing circuit 600 can be hardwired to ensure high-speed performance. In another embodiment, the processing circuit 600 can be built as an ASIC (Application-Specific Integrated Circuit).

While the foregoing is directed to embodiments of the present invention, other and further embodiments of the invention may be devised without departing from the basic scope thereof, and the scope thereof is determined by the claims that follow.

What is claimed is:

1. In a digital system comprising a processor, a device, and a bridge coupling the processor and the device, a method for the processor to perform a task of accessing the device via the bridge, the method comprising:

providing a processing circuit in the bridge;

building at least a first read/write control block (RWCB) with the processors, wherein building at least the first RWCB with the processor comprises building the first RWCB in a main memory coupled to the bridge and the processor;

signaling the processing circuit and switching to another task with the processor;

processing at least the first RWCB with the processing circuit to access the device; and interrupting the processor with the processing circuit, 2. The method of claim 1, wherein providing the processing circuit in the bridge comprises providing a control block address register in the processing circuit for storing an address of the first RWCB.

3. The method of claim 2, wherein providing the processing circuit in the bridge further comprises providing a control block register in the processing circuit for storing the first RWCB.

4. The method of claim 3, wherein providing the processing circuit in the bridge further comprises providing an error status register in the processing circuit for storing a result of the processing of at least the first RWCB.

5. The method of claim 1, wherein building at least the first RWCB with the processor further comprises building a status field in the first RWCB for storing a result of the processing of the first RWCB.

6. The method of claim 5, wherein building at least the first RWCB with the processor further comprises building at least an address/data field in the first RWCB for storing control data determining whether and how a read phase or a write phase corresponding to the address/data field is to be performed.

7. The method of claim 6, wherein building at least the first RWCB with the processor further comprises building a link pointer field in the first RWCB for storing an address of a second RWCB.

8. The method of claim 5, wherein processing at least the first RWCB with the processing circuit to access the device comprises updating the status field in the first RWCB to reflect the result of the processing of the first RWCB.

9. The method of claim 1, further comprising obtaining, with the processor, a result of the processing of at least the first RWCB.

10. The method of claim 1, wherein the processing circuit is hardwired.

11. The method of claim 1, wherein the processing circuit is an application-specific integrated circuit.

12. A digital system, comprising a processor, a device, and a bridge coupling the processor and the device, wherein:

the bridge includes a processing circuit;

the processor is configured to:
build at least a first if read/write control block (RWCB) in a main memory coupled to the bridge and the processor;
signal the processing circuit to access the device; and
switch to a task other than stalling waiting for a result of the accessing of the device by the processing circuit; and the processing circuit is configured to process at least the first RWCB to access the device and interrupt the processor.

13. The system of claim 12, wherein the processing circuit comprises a control block address register configured to store an address of the first RWCB.

14. The system of claim 13, wherein the processing circuit further comprises a control block register configured to store the first RWCB.

15. The system of claim 14, wherein the processing circuit further comprises an error status register configured to store a result of the processing of at least the first RWCB.

16. The system of claim 12, wherein the processor is further configured to build a status field in the first RWCB for storing a result of the processing of the first RWCB.

17. The system of claim 16, wherein the processor is further configured to build at least an address/data field in the first RWCB for storing control data determining whether and how a read phase or a write phase corresponding to the address/data field is to be performed.

18. The system of claim 17, wherein the processor is further configured to build a link pointer field in the first RWCB for storing an address of a second RWCB.

19. The system of claim 16, wherein the processing circuit is further configured to update the status field in the first RWCB to reflect the result of the processing of the first RWCB.

20. The system of claim 12, wherein the processor is further configured to obtain a result of the processing of at least the first RWCB.

21. The system of claim 12, wherein the processing circuit is hardwired.

22. The system of claim 12, wherein the processing circuit is an application-specific integrated circuit.

23. In a digital system comprising a processor, a device, and a bridge coupling the processor and the device, the bridge including a processing circuit, a method for the processor to perform a task of accessing the device via the bridge, the method comprising;

building M read/write control blocks (M RWCBs) with the processor, M being a positive integer;

signaling the processing circuit and switching to another task with the processor;

processing the M RWCBs with the processing circuit to access the device; and interrupting the processor with the processing circuit;

wherein building the M RWCBs with the processor comprises, for each of the M RWCBs;
building at least one and at most N address/data fields in the RWCB, each of the address/data fields being for storing control data determining whether and how a read phase or a write phase corresponding to the address/data field is to be performed, N being related to a size of the RWCB; and
building a link pointer field in the RWCB for storing an address of a next RWCB to form a chain of the M RWCBs to be processing circuit.

* * * * *